United States Patent [19]

Lespinats et al.

[11] Patent Number: 4,617,439
[45] Date of Patent: Oct. 14, 1986

[54] PROCESS FOR HEATING A SUBSTANCE, FOR PURPOSES OF VULCANIZATION OR POLYMERIZATION

[75] Inventors: Christian Lespinats, Paris; Michel Minet, Ezanville, both of France

[73] Assignee: Valeo, Paris, France

[21] Appl. No.: 782,453

[22] Filed: Oct. 1, 1985

[30] Foreign Application Priority Data

Oct. 2, 1984 [FR] France ................................. 84 15106

[51] Int. Cl.$^4$ .............................................. H05B 6/80
[52] U.S. Cl. ...................... 219/10.55 M; 219/10.55 F; 219/10.55 R; 264/26; 425/174.8 E
[58] Field of Search ................ 219/10.55 M, 10.55 R, 219/10.55 A, 10.55 F, 10.55 E; 264/26, 25, 27; 425/174.8 R, 174.8 E; 156/272.2

[56] References Cited

U.S. PATENT DOCUMENTS

| | | | |
|---|---|---|---|
| 2,595,502 | 5/1952 | Aicher et al. | |
| 3,294,879 | 12/1966 | Jacobs | 219/10.55 M X |
| 3,475,522 | 10/1969 | Garibian et al. | 264/26 X |
| 3,502,767 | 3/1970 | Morrison et al. | 264/297 |
| 3,851,131 | 11/1974 | Johnston et al. | 219/10.55 |
| 4,454,403 | 6/1984 | Teich et al. | 219/10.55 M X |
| 4,456,806 | 6/1984 | Arimatsu | 264/26 X |
| 4,477,707 | 10/1984 | Kim | 219/10.55 M X |

FOREIGN PATENT DOCUMENTS

| | | |
|---|---|---|
| 892040 | 10/1953 | Fed. Rep. of Germany . |
| 1565075 | 4/1969 | France . |
| 653794 | 5/1951 | United Kingdom . |
| 1163247 | 9/1969 | United Kingdom . |

Primary Examiner—Philip H. Leung
Attorney, Agent, or Firm—Charles E. Brown; Charles A. Brown

[57] ABSTRACT

In a process for heating a substance which is substantially non-conducting electrically, at least one layer of the substance is disposed within a cavity between two plates of a metal which is a good conductor of electricity. Each plate lies in intimate contact with a respective one of the two larger surfaces of the substance. The resulting assembly of the substance and the plates is disposed at a predetermined minimum distance from the walls of the cavity. The substance is then exposed to electromagnetic radiation in the decimeter wavelength band at a predetermined power level and for a predetermined time.

8 Claims, 3 Drawing Figures

PROCESS FOR HEATING A SUBSTANCE, FOR PURPOSES OF VULCANIZATION OR POLYMERIZATION

BACKGROUND OF THE INVENTION

1. Field of the invention

The present invention concerns a process for heating a body formed of a heat-hardenable substance by means of electromagnetic radiation, in order to polymerize it.

2. Description of the prior art

There are known heating processes employing a cavity in which the substance or object to be heated is placed to be exposed to electromagnetic radiation. This type of process employs a device, commonly known as a "microwave oven", which finds applications in industrial vulcanization and polymerization processes involving heating certain substances.

The electromagnetic field alternates at a very high frequency (2.45 GHz according to French regulations, for example) and causes dielectric losses which heat the body and thus achieve the required result.

However, because of multiple reflections of the waves from the walls of the oven, it is difficult to control the spatial distribution of the energy transmitted to the substance.

For this reason, the disposition in the oven of any conductive material (especially metal) part which would disturb the direction of the electromagnetic field through acting as a reflecting screen is depreciated.

The lack of control over the orientation of the electromagnetic field produces irregularities in the field causing irregular heating within the substance, certain areas being more heated than others. It is known that an increase in the temperature of a substance generally increases its loss factor.

By virtue of this increase, the loss factor conditions the temperature rise. As this is directly proportional to the losses, the process rapidly becomes locally unstable and the regions of the substance subject to the highest temperature rises absorb the greater part of the electromagnetic energy.

Apart from the fact that other regions are not sufficiently heated, the regions in which these instabilities (known as "thermal runaway") occur are overheated and therefore often burnt.

The importance of the consequences described naturally varies depending on the nature of the operation to be carried out, and it will be obvious that it becomes critical in operations to vulcanize or polymerize a synthetic material which breaks down at relatively low temperatures.

The invention is directed towards remedying the disadvantages due to lack of control over the direction of the electromagnetic field to which the substance to be heated is exposed, by appropriately guiding the field.

In this way it is possible to control the distribution of energy within the substance and to bring about a homogeneous increase in the temperature of the substance.

SUMMARY OF THE INVENTION

The invention resides in a process for heating a substance which is substantially non-conducting electrically, in which at least one layer of the substance is disposed within a cavity between two plates of a metal which is a good conductor of electricity and each of which lies in intimate contact with a respective one of the two larger surfaces of the substance with the resulting assembly of the substance and the two plates at a predetermined minimum distance from the walls of said cavity and said substance is then exposed to electromagnetic radiation in the decimeter wavelength band at a predetermined power level and for a predetermined time.

The substance may constitute generally planar panels and a stack of such panels may be assembled with interleaved between the panels and on the top and bottom of the stacked plates of a metal which is a good conductor of electricity which lie in intimate contact with the panels and the stack being disposed at a predetermined minimum distance from the walls of said cavity.

In this way it is possible to expose the substance to a homogenous electromagnetic field irrespective of its position within the cavity, the metal plates imposing a defined orientation, normal to their plane, on the waves which constitute the field. The plurality of panels stacked up alternately with metal plates (in this instance in the form of adjacent profiled members, hereinafter referred to as "shaping profiles") makes it possible to achieve a distribution of energy which is advantageously constant in all of the panels.

However, in spite of such guiding of the orientation of the electromagnetic field, standing waves are set up in any panel of a substance with finite dimensions. These standing wave may give rise to variations in the distribution of the field strength. within the substance, even if the radiation to which the substance is initially exposed is homogeneous. Standing waves arise along all three axes.

In the direction of the thickness this disadvantage is avoided in accordance with the invention by limiting the thickness of the panel to less than one half wavelength, in which case standing waves cannot arise.

Along the other two axes, the standing waves introduce variations in heating effect according to their spatial distribution. In order to remedy this disadvantage, the shaping profiles or plates are made of a metal which is a particularly good conductor of heat. As the shaping profiles are, in accordance with the invention, disposed in intimate contact with the substance they serve as thermal bridges between the various areas heated to a greater or lesser extent, and therefore have a regulating effect which regularizes the spatial distribution of the heating effect. It will be obvious that in order to achieve a homogeneous distribution, the contact and thus the thermal bridge being obtained along two axes only, it is essential to have first avoided the creation of standing waves along one at least of the three axes.

There is thus achieved in accordance with the invention guidance of the electromagnetic field within the panels which are exposed to it and additional thermal regulation providing for homogeneous heating at all points in the thickness of said panels.

Various shapes may be achieved within the scope of the invention, of course.

The characteristics and advantages of the present invention will emerge from the following description given by way of non-limiting example and with reference to the appended drawings.

DESCRIPTION OF THE PREFERRED EMBODIMENT

Figure 1:
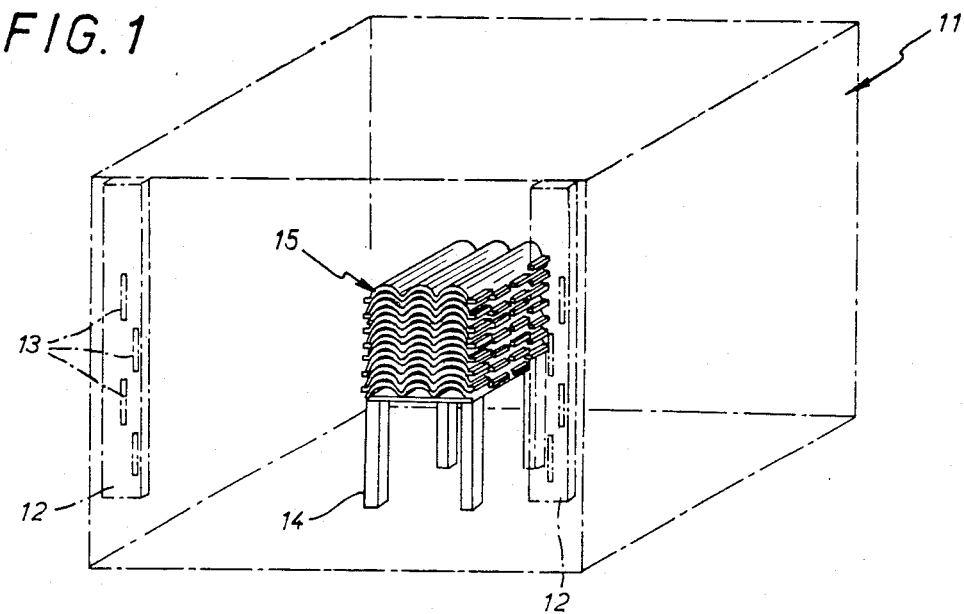
FIG. 1 is schematic representation in perspective of one method for electromagnetic field heating of a stack by means of one embodiment of the process in accordance with the invention.
Figure 2:
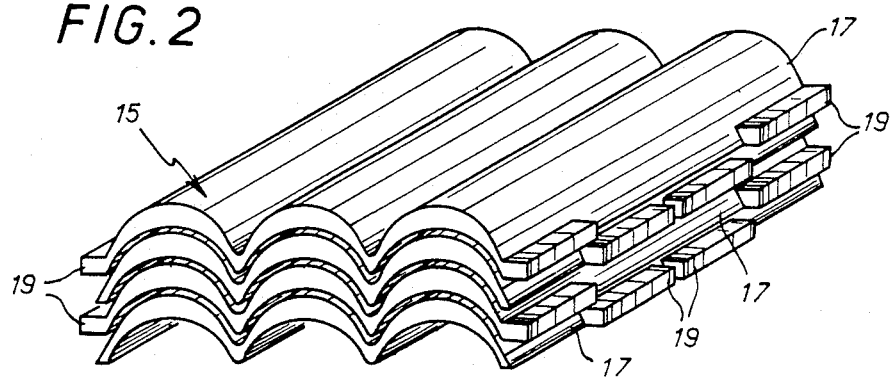
FIG. 2 is a representation in perspective of one embodiment of a stack in accordance with the invention.
Figure 3:
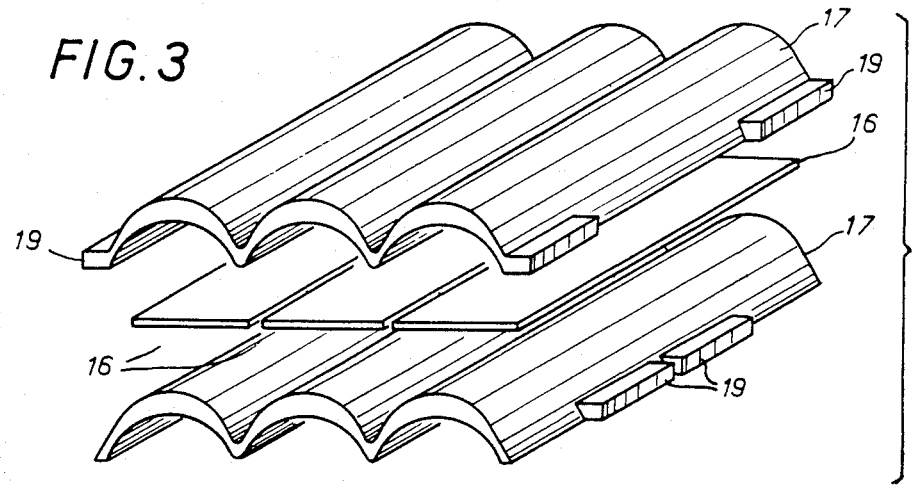
FIG. 3 illustrates a first step in one embodiment of the invention.

The embodiment selected and shown provides the basis for a description of a process adapted to the manufacture of a multiplicity of tile-shaped members, specifically by polymerizing a heat-hardenable substance, which is heated by electromagnetic radiation by placing it inside a so-called "microwave" oven.

The "microwave" oven employed is of the type comprising a cavity 11 delimited by conducting walls, the cavity being sealed against the exit of heat and electromagnetic radiation. Two tubular waveguides 12 comprising radiating antennas 13, here in the form of slots, the disposition and size of which are known per se, are used to transmit electromagnetic radiation at a specific frequency (2.45 GHz) into the cavity. The electromagnetic energy is supplied to the waveguides 12 by an appropriate generator (not shown). The type of "microwave" oven used to implement the process in accordance with the invention does not form part of the invention itself.

Prior to polymerization, the substance is of a sufficiently firm consistency to be self-supporting; in other words, it will not deform without the application of significant external force.

The process in accordance with the invention is implemented in the following manner:

A succession of flat rectangular panels 16 of the substance are made with a predetermined thickness, less than one half wavelength, the wavelength being defined by the frequency of the radiation employed (in this instance 2.45 GHz) and by the medium in which the radiation propagates, in this case the substance to be polymerized.

The succession of panels 16 is disposed in a number of superposed planes, with three panels per plane, prior to shaping. Each panel is intended, after shaping, to constitute a tubular sector which if required can be cut subsequently, after processing.

Each layer of three successive adjacent panels is separated from the identical layers above and below it by a rigid metal member 17 in the shape of three tubular sectors fastened together along a generatrix, resembling a roofing tile. These metal members 17, referred to hereinafter as "shaping profiles", are electrically and thermally conductive, being advantageously of aluminum alloy. They are identical to one another except for the position of projections 19 provided to enable them to be handled. In this example the profiles are of variable thickness, but this does not offer any form of impediment to implementation of the process in accordance with the invention. Each tubular sector of a shaping profile 17 has two surfaces, an upper surface and a lower surface, the radii of which are slightly different, so as to confer two different radii on the panels 16 of the substance concerned, thus making it possible to obtain members in the shape of a tubular sector. These radii are centered on two different axes, offset normally to the planes as defined hereinabove in order to compensate for the average thickness of a shaping profile 17. There is in this way obtained a stack 15 of panels 16 of the substance alternating with shaping profiles 17, the top and bottom surfaces of the stack 15 being also constituted by shaping profiles 17. The panels of the substance serve also as spacers, eliminating any electrical contact between the shaping profiles.

According to the embodiment described herein, the panels 16 of the substance are shaped by the interleaved profiles 17. The stack 15 is compressed in such a way that the panels 16 of the substance take up the shapes defined by the shaping profiles. The parallel axes of the adjacent tubular sectors of each of the thus stacked shapes determine a plurality of superposed parallel planes, the median plane of which is defined as being the general plane of the stack. The shape of the shaping profiles 17 is determined by the final shape that is to be conferred on the panels. It may be different in other embodiments of the invention.

The stack 15 formed in this way is then placed in the microwave oven 11 which is to expose the stack to electromagnetic radiation, the effect of which is, as is known, to cause heating of a non-conductive material, in this instance the panels 16 which are to be processed. The stack 15 is disposed in such a way that the median plane of the stack is coincident with the median plane parallel to the base wall of the oven intended to be the seat of electromagnetic radiation.

The electromagnetic radiation within the cavity consists of two separate fields:

A first field, which will be referred to as the "direct" field, consists of the set of waves emitted by the source of radiation, according to a specific directivity law, and having as yet not met any obstacle on their path of propagation. This field decreases in intensity in the direction away from the source.

A second field, which will be referred to as the "reflected" field, consists of the set of waves emitted by the source into the cavity which have been subjected to at least one reflection during their propagation.

Although the direct field and the reflected field are superposed, it is possible to determine an area in which the direct field is dominant, in particular by virtue of the fact the overall intensity decreases in the direction away from the source, and an area in which the reflected field dominates, within which the intensity is theoretically distributed homogeneously in space, despite the specific problem of standing waves which may occur and which have to be minimized in a manner which is known per se.

For the reasons explained hereinabove, one objective is to obtain as homogeneous as possible a distribution of the field between the various panels of the substance, which requires that the field be homogeneous within the cavity; it is thus evident that on implementing the process in accordance with the present invention the stack 15 will be placed in the area of the cavity 11 in which the reflected field is dominant. In order to position the stack 15 at the required location during the heating operation, it is placed on a support 14 which is transparent to electromagnetic radiation. The electromagnetic field is then generated at a predetermined power level and for a predetermined time in order to carry out the heat treatment of the panels 16.

In accordance with the invention the stack 15 is arranged in such a way that the shaping profiles 17 lie in intimate contact with the panels 16 of the substance, so that only the edges of said panels 16 of the substance are exposed and are thus accessible to the electromagnetic radiation, which penetrates into the substance.

As the shaping profiles 17 are reflective, the electromagnetic waves cannot pass through them. As the field is also oriented in the direction of the normal to their surface within the space which separates two superposed profiles, this field is therefore identical and homogeneous in all the layers of the substance separating the shaping profiles 17. These shaping profiles thus in this instance serve as secondary waveguides.

Remaining irregularities in the spatial distribution of the field within each panel 16 of the substance are due only to the standing waves which arise according to the specific dimensions of these panels. By limiting these standing waves to an orientation along the two axes which define the surface of contact with the shaping profiles 17, there are established thermal bridges between the hotter areas and the colder areas which have a regulating effect. To this end the shaping profiles are made from a metal selected to a good conductor of heat, in addition to its electrical conduction properties. An aluminum alloy may be employed with advantage, for example.

The elimination of standing waves along one of the three axes is a simple matter and known per se: it is sufficient for the dimension of the parts to be polymerized, in this instance the panels 16 of the substance, to have a dimension along this axis which is less than one half wavelength of the radiation propagating in the material.

In this way the energy of the electromagnetic radiation is homogeneously distributed through all the panels 16 of the substance, after shaping of the latter, and when the effects of standing waves within each panel have been compensated by thermal regulation. In this way the phenomena of local increases of the field due to a localized temperature rise in one region are avoided. It is known that this thermally divergent phenomenon is fundamentally unstable. As previously described, it gives rise to thermal runaway leading to uncontrolled local overheating of the substance, which is thus rendered unusable. The process according to the present invention overcomes this problem.

As the temperature increase may be controlled throughout the substance, it is also possible to reproduce the process on an industrial scale, that is to say identically, as often as necessary and with constant processing quality, which is indispensible in this case. Also, the heating effect is the same in all layers. Apart from enhancing the quality of the processed material, this permits effective temperature monitoring using a single sensing point.

The process described may also be used with a plurality of panels 16 of the substance and/or a plurality of the metal members 17 juxtaposed in a horizontal plane, provided that the metal members 17 are not placed in contact with one another.

It will be understood that various changes in the details, materials and arrangements of parts which have been herein described and illustrated in order to explain the nature of the invention may be made by those skilled in the art within the principle and scope of the invention as expressed in the appended claims.

The panels and plates could be planar, for example.

We claim:

1. Process for vulcanizing or polymerizing a non electrically conducting substance comprising the steps of:
   sandwiching a layer of the substance between and in intimate touching mating relation with two separate plates of a good electrically conductive metal to form an assembly;
   disposing the assembly in a cavity defined by walls at a positive predetermined minimum spacing from the walls of the cavity; and
   exposing the assembly to electromagnetic radiation within the decimeter wavelength band at a predetermined power level and for a predetermined time so as to obtain polymerization or vulcanization of the substance.

2. Process accroding to claim 1, wherein the thickness of the layer of substance is less than half the wavelength of the radiation.

3. Process according to claim 1, wherein a plurality of the layers of substance are sandwiched between a corresponding plurality of the plates, each of the layers of substance constituting a generally plane panel, and the assembly comprising a stack of panels interleaved between the plates, and being terminated at its top and bottom ends by a plate.

4. Process according to claim 3, wherein the plates are good conductors of heat.

5. Process according to claim 3, wherein the plates are of a non-planar shape and by virtue of their profile function to shape the panels upon compressing the stack in a direction normal to the general plane of the panels.

6. Process according to claim 1, wherein the layer of substance is of generally rectangular shape in plan and comprises at least two tubular sectors.

7. Process according to claim 1, wherein the minimum predetermined spacing between the assembly and the walls of the cavity is at least one and a half times the wavelength of the radiation.

8. Process accroding to claim 1, wherein the cavity is defined in a microwave oven.

* * * * *